US005851378A

United States Patent [19]

Vogt et al.

[11] Patent Number: 5,851,378

[45] Date of Patent: Dec. 22, 1998

[54] HYDROCRACKING CATALYST COMPRISING COATED CRACKING COMPONENT PARTICLES

[75] Inventors: Eelco Titus Carel Vogt, Utrech; Hendrik Gerard Bruil, Ede, both of Netherlands

[73] Assignee: Akzo Nobel NV, Arnhem, Netherlands

[21] Appl. No.: 737,944

[22] PCT Filed: Jun. 2, 1995

[86] PCT No.: PCT/EP95/02132

§ 371 Date: Nov. 21, 1996

§ 102(e) Date: Nov. 21, 1996

[87] PCT Pub. No.: WO95/33562

PCT Pub. Date: Dec. 14, 1995

[30] Foreign Application Priority Data

Jun. 3, 1994 [EP] European Pat. Off. .............. 94201591

[51] Int. Cl.[6] ............................ C10G 47/02; C10G 47/18

[52] U.S. Cl. .......................... 208/111; 208/108; 208/109; 208/110; 502/63; 502/64; 502/66; 502/67; 502/74; 502/77; 502/325; 502/305; 502/313; 502/332

[58] Field of Search .................................... 208/108, 109, 208/110, 111; 502/63, 64, 66, 67, 74, 77, 325, 305, 313, 332

[56] References Cited

U.S. PATENT DOCUMENTS 4,023,869 5/1977 Rollmann ........................... 252/455 Z 5,082,814 1/1992 Stockwell et al. ........................ 502/68

FOREIGN PATENT DOCUMENTS 0 499 799 8/1992 European Pat. Off. ......... B01J 29/28

824825 12/1959 United Kingdom .

OTHER PUBLICATIONS

*Journal of Colloid and Interface Science,* vol. 21 (1966) 405–414.

*International Search Report,* dated Oct. 4, 1995.

*Primary Examiner*—Walter D. Griffin
*Assistant Examiner*—Nadine Preisch
*Attorney, Agent, or Firm*—Oliff & Berridge, PLC

[57] ABSTRACT

The invention relates to a hydrocracking catalyst containing at least one hydrogenation metal component, and particles of a cracking component of which at least 50% of the outer surface is coated with a layer of a pre-formed oxide, which layer has a thickness in the range of 10 nm to 5 μm. The cracking component is either a zeolitic cracking component or an amorphous cracking component or a mixture of both. The particles may be coated with oxide by contacting uncoated particles having a mean particle size in the range of 0.1 to 10 μm with an aqueous medium containing particles of the oxide to be provided as the coating having a particle size in the range of 10–5000 nm, with the ratio between the oxide particle size and the mean particle size of the cracking component particles being in the range of 0.001:1 to 0.5:1. The coating oxide is preferably alumina or silica/alumina.

8 Claims, No Drawings

HYDROCRACKING CATALYST COMPRISING COATED CRACKING COMPONENT PARTICLES

BACKGROUND OF THE INVENTION

1. Field of the Invention

The invention pertains to a hydrocracking catalyst comprising coated particles of a cracking component, such as zeolite particles, or particles of an amorphous cracking component such as silica-alumina, or mixtures thereof, which are coated with an inorganic oxide.

2. Description of Related Art

The oil refining industry commonly employs hydrocracking processes to convert hydrocarbonaceous feedstocks to products of a lower boiling range. Such processes entail contacting the feedstock with hydrogen at elevated temperature and pressure under the influence of a catalyst, with the catalyst containing at least a hydrogenation component and an acidic component which effects the actual cracking. The catalyst generally also comprises a support or binder material. The acidic cracking component is generally either a zeolite or an amorphous cracking component, but may also be a combination of both.

Hydrocracking processes are generally carried out at a pressure in the range of about 100 to 250 bar and a temperature in the range of 230° to 450° C. In the context of this invention hydrocracking processes include all processes in which hydrocarbons are cracked in the presence of hydrogen, including, int. al., hydrodewaxing.

A more recent development is to carry out hydrocracking processes in reactors commonly employed for hydrodesulphurisation and/or hydrodenitrogenation. The cost of constructing "regular" hydrocracking reactors is substantial on account of the high pressures which occur during operation, and it has been found that even though reactors designed for hydrodesulphurisation and/or hydrodenitrogenation do not permit such high pressures, achieving a certain degree of hydrocracking, notably to middle distillate, at these lower pressures, say below 100 bar, is nevertheless becoming increasingly relevant. This type of hydrocracking is also referred to as "mild hydrocracking" (MHC).

SUMMARY OF THE INVENTION

There is a continuing need for hydrocracking catalysts with an improved activity, both in normal hydrocracking and in mild hydrocracking, and an improved selectivity, notably to middle distillates. The present invention provides such an improved hydrocracking catalyst. The hydrocracking catalyst according to the invention comprises hydrogenation metals and a cracking component, which is either a zeolitic cracking component, or an amorphous cracking component, or a mixture of both, which catalyst is characterised in that at least 50% of the outer surface of said cracking component has been coated with a layer of previously formed inorganic oxide, which layer has a thickness in the range of 10 nm to 5 μm, more commonly in the range of 10 nm to 2 μm. The oxide layer has been applied to the zeolite particles before the zeolite particles are incorporated into the hydrocracking catalyst.

DETAILED DESCRIPTION OF THE INVENTION

If in the framework of this invention reference is made to coated cracking component particles, what is meant is that at least 50% of the outer surface of said cracking component particles is coated with a layer of inorganic oxide, which layer has a thickness in the range of 10 nm to 5 μm, generally in the range of 10 nm to 2 μm. It is preferred for the outer surface of the cracking component particles to be coated to the fullest possible extent, up to 100%.

It is noted that within the framework of the invention the term zeolite refers not just to aluminosilicate zeolites but to all materials functioning as molecular sieves. Preferred zeolites for use in hydrocracking catalysts will be discussed in more detail below.

It is further noted that within the framework of this invention the term amorphous cracking component refers to all amorphous cracking components which are known for use in hydrocracking. These components will also be discussed in more detail below.

The use of coated zeolite particles instead of uncoated zeolite particles in hydrocracking catalysts has the advantage that the zeolite is protected from the extreme pH values that may be encountered in the preparation of the hydrocracking catalyst. Zeolites can be susceptible to high and low pH values; if they are contacted with media having a very low or a very high pH, there is a risk of the crystallinity of the zeolite being damaged. As mentioned above, hydrocracking catalysts generally will contain zeolite particles in a support material, in combination with one or more hydrogenation metals. The preparation of the catalysts may take the form of the zeolite being mixed with a precursor of the support material in an aqueous medium. Such support material precursor-containing media tend to have a low, or even very low pH, which may lead to the zeolite being damaged. The hydrogenation metals are often incorporated into the catalyst via impregnation with an impregnation solution containing water soluble salts of the hydrogenation metals. This impregnation solution is often highly basic. If the zeolite is contacted with this solution, its crystallinity may be damaged anew. By being coated with an inorganic oxide, in particular with alumina, prior to its incorporation into the hydrocracking catalyst, the zeolite is protected against high as well as low pH values. As a result, a hydrocracking catalyst is obtained which comprises a less damaged, and hence more active, zeolite than would be the case if the hydrocracking catalyst were to comprise uncoated zeolite.

It is speculated that an advantage of the use of coated cracking component particles which holds for both zeolitic and amorphous cracking components is that the hydrogenation metals end up more specifically near the cracking component particles during the impregnation of the hydrogenation metals. This will improve the activity of the catalyst.

A further advantage of the use of coated cracking component particles, whether zeolitic or amorphous, as compared to the corresponding uncoated counterparts is that they can be extruded more easily because they behave, as it were, as if they were the oxide with which they are coated. This makes it possible to incorporate more cracking component particles, and specifically more zeolite particles, into the hydrocracking catalyst, thereby improving its activity. This advantage is so great that it becomes possible to prepare hydrocracking catalysts without any additional support material at all.

It should be noted that hydrocracking catalysts comprising an alumina support in which the cracking component particles are partially coated with alumina are known in the art. However, in those cases, the alumina coating is formed in situ accidentally during the preparation of the catalyst; the cracking component particles are not coated with alumina before they are incorporated into the hydrocracking catalyst, as is envisaged in the present application. The difference between coatings formed in situ during the preparation of the catalyst and coatings which are applied on the cracking component particles beforehand is that the coating formation which takes place in situ is uncontrollable; it is not possible to ensure that coating takes place, nor that every cracking component particle will be coated. Further, the alumina formed in situ will be amorphous. In contrast, when the cracking component particles are coated with oxide before they are incorporated into the catalyst, the coating process and the nature and crystallinity of the coating can be controlled.

EP-A 0 499 799 describes a hydrocracking catalyst suitable for the conversion of aromatic hydrocarbons, which catalyst comprises a pentasil-type zeolite which has been coated with alumina by contacting the zeolite with a sodium aluminate solution and raising the pH of said solution by the addition of ammonia, thus causing alumina to precipitate on the zeolite particles and so resulting in a zeolite particle coated with in situ formed alumina.

However, the quality of said in situ formed coating provided on the zeolite particles by means of the process described in the above-mentioned European patent application is unsatisfactory when it is intended to employ the thus coated zeolite particles in a hydrocracking catalyst. In the first place, there is no indication that the coating obtained in said European patent application is complete. Further, in such a precipitation process there is only little attraction between the particles to be coated and the oxide, and it is quite possible that substantial amounts of oxide will not precipitate on the zeolite particles at all. Further, the adhesion of the coating to the zeolite particles is not always satisfactory.

Additionally, the alumina which precipitates on the zeolite particles in the in situ coating processes described in said European patent application is relatively amorphous by nature. This relatively amorphous alumina displays a highly aselective cracking activity; it cracks hydrocarbon feeds to form coke and light gases. By incorporating zeolite particles coated with relatively amorphous alumina into a hydrocracking catalyst an undesirable cracking activity is added to the catalyst, so reducing the catalyst's selectivity to middle distillates.

A further drawback to the in situ coating process disclosed in said European patent application consists in that during the coating process the protons, or proton precursors such as ammonium ions, in the zeolite can be, and often are, exchanged with the cations of which the oxides are to precipitate on the zeolite, such as, in the case of an alumina coating, aluminium ions. This is an uncontrollable process which may detrimentally affect the properties of the zeolite. Further, the very small hydr(oxide) particles formed during the in situ coating process may block the pores of the zeolite.

In order to avoid the above-mentioned disadvantages of the use of in situ formed alumina, and to provide a hydrocracking catalyst comprising a coated cracking component with improved properties, including an improved middle distillate selectivity as compared to a catalyst with a comparable composition in which the zeolite is not coated, the present invention provides a hydrocracking catalyst comprising a cracking component the particles of which have been coated using previously formed inorganic oxide.

The oxide may be coated onto the cracking component particles by way of a heterocoagulation process. That is, use is made of the attracting force between the coating particles and the particles to be coated, which attracting force is caused by the differences in isoelectric points of the various components. The presence of an attracting force results in a high quality coating. In this respect it is noted that in the process of the above-discussed European patent application the precipitation process is carried out at a pH of about 8, while in the present invention the cracking component particles are generally coated at a pH below 7. The heterocoagulation process by which the coated zeolite particles to be used in the catalyst according to the invention may be prepared will be described in more detail below.

Another advantage of the hydrocracking catalyst according to the invention is that, because in the present invention the oxide is formed prior to being provided on the particles of the cracking component, its properties, such as in the case of alumina, e.g., crystallinity, can be regulated.

Additionally, there is no risk of small in situ formed oxide particles entering and blocking the pores of the cracking component. Further, in the case of a zeolite being used a cracking component, since the aqueous dispersion will comprise few cations of the oxide to be coated onto the zeolite, there will be no replacement of protons or proton precursors in the zeolite lattice.

The cracking component particles present in the hydrocracking catalyst according to the invention may be prepared by contacting the particles to be coated having a mean particle size in the range of 0.1 to 10 $\mu$m with an aqueous medium containing particles of the oxide to be provided having a particle size in the range of 10 to 5000 nm, preferably 10 to 1000 nm, with the ratio between the oxide particle size and the particle size of the cracking component particles being in the range of 0.001:1 to 0.5:1.

It is noted that GB patent specification 824 825 describes a process for coating zeolite particles with aluminium hydroxide to improve the zeolite's hardness. The particles are used as adsorbents; no mention is made of using them in catalysts.

Depending on the nature of the coating and the nature of the matrix material, TEM and STEM/EDX can sometimes be used to study whether or not a hydrocracking catalyst comprises cracking component particles with a coating as defined above, and the thickness of the coating. If the composition of the coating and the composition of the matrix are different, it is generally possible to distinguish the coating on the cracking component particles from the matrix material with the aid of STEM/EDX.

There are several ways in which the coating of the cracking component particles can be studied before the particles are incorporated into the hydrocracking catalyst. When the coated cracking component particles are studied with TEM and STEM/EDX, the coating can be observed. The coating can also be observed with SEM.

The presence of a complete coating on the cracking component particles, especially if they are zeolite particles, can also be ascertained by electrokinetic route. The crux of this technique is that the isoelectric points (IEP), which can be determined by electrokinetic techniques such as acoustophoresis, of the coating material and of the material to be coated differ, and that if a material is coated, it will have the IEP of the material with which it is coated instead of the IEP it had in the uncoated state. For example, the IEP of an ammonium exchanged USY-zeolite will generally be well below 6. When a coating, e.g., an alumina or titania coating, is applied to the surface of such a zeolite, the IEP of the coated zeolite particles will be the same as the IEP of the oxide with which the zeolite is coated, in the case of alumina in the range of 8.9–9.0, and in the case of titania in the range of 7.0–7.5. This confirms that the outside of the zeolite particles is completely coated with oxide. The presence of a coating can also be ascertained by studying the sedimentation behaviour of mixtures of zeolite and oxide, e.g., alumina or titania, as a function of the amount of oxide. Dispersions of uncoated zeolite particles in water are not stable; sedimentation occurs rather rapidly. On the other hand, alumina and titania sols are stable. It was found that if a zeolite slurry is mixed with increasing amounts of alumina sol, the resulting suspension becomes stable beyond a certain point; no sedimentation occurs anymore. Thus, the zeolite particles display the stability behaviour of the alumina or titania, respectively, confirming that the zeolite particles are coated with said oxide.

The inorganic oxide with which the cracking component particles are coated is selected from one or more inorganic oxides, such as oxides of the transition metals and alkaline earth metals. Both physical and chemical mixtures of these oxides are envisaged. Suitable coating materials are, e.g, alumina, silica, alumina-silica, silica-alumina, titania, zirconia, magnesia, silica-magnesia, calcium (hydr)oxide, clays, barium oxide, strontium oxide, barium titanate, and the various aluminophosphates. It is noted that in the context of this description the term oxide, when used to indicate the material (to be) coated on the cracking component particles is meant to comprise not only oxides, but, where appropriate, also hydroxides. The preferred oxides are alumina and alumina-silica, i.e., alumina comprising a minor amount, say up to 15 wt. %, of silica. If alumina is used, this is preferably in the form of boehmite or pseudoboehmite, which can be converted to gamma-alumina when the boehmite coated cracking component particles are subjected to a calcination step. The alumina coated cracking component particles may be subjected to a calcination step before they are incorporated into a hydrocracking catalyst, but the conversion of boehmite into gamma-alumina may also take place when the support material comprising the alumina coated cracking component particles is calcined, or when the finished hydrocracking catalyst is calcined. As stated before, the fact that the oxide to be coated on the cracking component particles is formed before it is contacted with the particles to be coated makes it possible to regulate the nature and properties of the oxide.

The process for preparing the cracking component particles to be incorporated into the hydrocracking catalyst according to the invention may be carried out as follows.

A slurry is prepared of cracking component particles, e.g., zeolite particles of a mean particle size of 0.1 to 10 $\mu$m, preferably of 0.1 to 5 $\mu$m. Unless otherwise indicated, in the present application the term mean particle size refers to the particle size at which 50 wt. % is of the particles has a greater particle size while the other 50 wt. % of the particles has a smaller particle size. The slurry of cracking component particles of the desired particle size may be prepared, e.g., by, slurrying larger cracking component particles in water and grinding the whole, e.g., in a glass pearl mill such as a Dynomill. The slurry usually contains 3 to 60 wt. % of cracking component, preferably 5 to 40 wt. %. If a zeolite is used as cracking component, the pH of the zeolite slurry is in the range of 3 to 8. Care should be taken to ensure that the pH of the zeolite slurry does not become too low, since this may affect the zeolite's stability.

Also, in a known manner, a dispersion is prepared of inorganic oxide of a particle size of 10 to 5000 nm, preferably of 10 to 1000, more preferably of 10 to 500 nm, in water. In the present application, the term particle size used in reference to the oxide (to be) coated onto the zeolite particles is defined as the value for $Z_{avg}$ determined by quasi-elastic light scattering in the manner described below. The preferred particle size of the oxide particles to be used for coating the zeolite particles will depend on the mean particle size of the zeolite particles to be coated. The ratio between the oxide particle size and the zeolite mean particle size is between 0.001:1 and 0.5:1, preferably between 0.001:1 and 0.1:1, more preferably between 0.001:1 and 0.05:1. Generally it can be stated that the quality of the coating obtained increases with increasing size difference between the oxide particles and the cracking component particles, and thus with a decreasing ratio between the oxide particle size and the cracking component particle size.

The oxide dispersion will generally contain 3 to 35 wt. % of inorganic oxide in water, preferably 5 to 25 wt. %. Depending on the nature of the oxide, the pH, the salt content of the medium, and other factors, the dispersion will often be a colloidal solution, i.e., a sol. For instance, if it is desired to provide alumina as inorganic oxide on the zeolite particles, an alumina dispersion will be needed. It can be obtained in a known manner, e.g., by peptising an alumina gel. Processes for the preparation of alumina gels are known to the skilled person and include, e.g., the precipitation of acidic and basic aluminium salts. Alumina gels comprise well defined, discrete alumina particles interconnected by chains of aluminium (hydr)oxide molecules. These chains are broken up by the addition of an appropriate peptising agent, giving separate particles of a particle size within the desired range. As suitable peptising agents may be mentioned nitric acid, hydrochloric acid, formic acid, and acetic acid. The thus obtained colloidal solution of alumina generally has a pH in the range of 1.5 to 5.

Next, the cracking component slurry and the oxide dispersion are combined. It generally makes no difference in this connection whether the oxide dispersion is added to the cracking component slurry or the cracking component slurry to the oxide dispersion. After combination of the cracking component slurry with the oxide dispersion the obtained mixed slurry is stirred for some time, say, up to 1 hour, or otherwise kept in motion, at a temperature between room temperature and 50° C. In this period the oxide will adhere to the surface of the cracking component particles. If the cracking component is a zeolite, care should be taken to ensure that the pH of the mixed slurry is not too low, the zeolite being susceptible to very low pH values. Preferably, the pH is between 3 and 7.

Once the oxide has adhered to the cracking component particles, the mixed slurry can, if necessary, be subjected to a treatment in which the formed aggregates are broken up into separate coated cracking component particles. This can be done, e.g., by grinding the slurry in a colloid mill.

The obtained slurry can be processed directly; alternatively, the coated cracking component particles may be dried first and, optionally, calcined. Drying takes the form of isolating the coated cracking component particles from the slurry where necessary, e.g., by means of filtration, and drying the resulting filter cake at a temperature in the range of room temperature to 150° C., for example by spray drying, flash drying, or other drying techniques. Frequently, however, the slurry will be so concentrated as to render isolation of the coated cracking component particles impractical, and the slurry is then dried directly. The dried product can be processed immediately, or be calcined first. The calcination treatment may be a steam calcination treatment. This may be particularly attractive if the cracking component is a zeolite which has not been subjected to a steam calcination step before. If the zeolite has been steam calcined previously, a dry calcination step will generally be employed. Calcining usually takes place at a temperature in the range of 150° to 600° C., preferably in the range of 250° to 400° C., over a period of 0.5 minutes to 2 hours, preferably of 5 minutes to 1 hour.

Whether the coated cracking component particles are to be subjected to a calcination step or not depends, int. al., on the manner in which they are to be further processed. Calcination of the coated particles ensures better adhesion of the oxide coating to the cracking component particles. If the coated cracking component particles are likely to be subjected to severe treatment such as prolonged or vigorous stirring at low pH values during the subsequent incorporation of the coated cracking component particles into the catalyst, it is preferred to carry out a calcination step; if there is to be no severe treatment, a calcination step may not be necessary. It is generally preferred to submit the coated cracking component particles to a calcination treatment before they are incorporated into the hydrocracking catalyst.

It should be noted that when it is intended to subject the coated cracking component particles to a steam calcination treatment, it is frequently superfluous to fully dry the zeolite particles first. Removing excess water, for instance, may well suffice.

Generally speaking, after the cracking component particles have been dried and/or calcined, they will be re-slurried in water prior to further processing, and the resulting slurry will be subjected to a treatment for breaking up any aggregates present into separate particles, say, by grinding the slurry in a Dynomill.

If, as described above, the cracking component particles are coated with pre-formed oxide in a single step, the obtained coated cracking component particles generally are coated with 0.5 to 30 wt. % of oxide, calculated on the weight of the cracking component. Too little oxide will result in incomplete coating and/or a too thin oxide layer, which means that the oxide layer is incapable of exerting its proper action. The maximum amount of oxide is determined by what maximally will adhere to the surface of the cracking component.

It is possible to increase the amount of oxide coating above this maximum by way of the following procedure. The coated particles are contacted with (poly)anions, such as phosphoric acid and its salts, polyelectrolytes, and anionic water-soluble polymers. Due to the adsorption of these compounds on the oxide coating, the coating becomes negatively charged. If the negatively charged coated particles are then contacted again with an oxide suspension in which the oxide particles are positively charged, the oxide will adhere to the coated cracking component particles, and a second coating layer is formed. This process can be repeated as many times as desired, until, e.g., a coating of 300 wt. % of oxide, calculated on the weight of the cracking component, is obtained.

The thickness of the oxide coating will be between 10 nm and 5 $\mu$m, commonly between 10 nm and 2 $\mu$m, depending on the amount of oxide applied to the cracking component particles, and on the size of the oxide particles. Surprisingly it was found that the use of the multiple coating procedure described above did not result in a thicker coating so much as a denser coating. Apparently, the repeated coating procedure described above does not substantially influence the thickness of the coating.

Generally, zeolite particles will be negatively charged. This negative charge can optionally be enhanced by contacting uncoated zeolite particles with the above-mentioned (poly)anions.

In general, the preferred thickness of the coating will depend on the size of the cracking component particles, the size of the oxide particles, the nature and morphology of the oxide particles, and the manner in which the coated cracking component particles are to be incorporated into the hydrocracking catalyst according to the invention.

The hydrocracking catalyst according to the invention comprises at least one hydrogenation metal component, and coated cracking component particles, which may be either coated zeolite particles, or coated amorphous cracking component particles, or a mixture thereof. Other components, such as, e.g., support materials may also be present.

As suitable zeolites for incorporation into hydrocracking catalysts after coating with an inorganic oxide may be mentioned zeolite X, zeolite Y, zeolite L, zeolite omega, ZSM-4, zeolite beta, mordenite, MCM-22, MCM-41, TMA-offretite, ZSM-5, ZSM-11, ZSM-12, ZSM-23, ZSM-35, ZSM-38, hexagonal faujasites, and modifications of these zeolites. As non-aluminosilicate molecular sieves, which, as stated before, are also referred to as zeolites in the context of the present application, may be mentioned the metallosilicates and the silicoaluminophosphates. Examples of suitable metallosilicates are borosilicates and iron silicates; examples of suitable silicoaluminophosphates are SAPO-5, SAPO-11, SAPO-31, SAPO-34, SAPO-40, and SAPO-41. The pore diameter of these zeolites is in the range of 0.5 to 4.0 nm, preferably in the range of 0.6 to 2.5 nm, more preferably in the range of 0.6 to 1.2 nm. Zeolite Y and modifications thereof, i.e., Y-type zeolites having a unit cell size in the range of 2.400 to 2.475 nm and a molar silica:alumina ratio in the range of 3.5 to 100, are generally preferred for use in hydrocracking catalysts.

If the zeolite is used in the proton form or the ammonium form, it will generally contain less than 0.5 wt. % of alkali metal oxide and preferably less than 0.2 wt. %.

The amount of coated zeolite particles in the hydrocracking catalyst usually is in the range of 5 to 80 wt. %, calculated as zeolite without coating on the total catalyst. As stated above, it is possible to prepare hydrocracking catalysts comprising coated zeolite particles which do not contain any additional support material.

Suitable hydrogenation metal components will comprise the metals, oxides, and sulphides of the elements of Group VIB and Group VIII of the Periodic Table. Preference is given to the metals, oxides, and sulphides of platinum, palladium, nickel, cobalt, molybdenum, and tungsten. Also, use may be made of combinations of these metal components, especially of combinations of components of nickel and tungsten, cobalt and molybdenum, and nickel and molybdenum. The amount of metal component in the hydrocracking catalyst generally is in the range of 0.2 to 2 wt. % when a noble metal is employed (calculated as metal). If non-noble metals from Group VIB and Group VIII are employed, they are used in amounts of 5 to 30 wt. %, calculated as trioxide, and 0.5 to 15 wt. %, calculated as oxide, respectively.

As suitable support materials which may be present in the hydrocracking catalysts according to the invention may be mentioned alumina, silica, alumina-silica, silica-alumina, silica-magnesia, zirconia, titania, silica-zirconia, clays, aluminophosphates, and mixtures of these support materials. Preference is given to alumina, notably gamma-alumina, alumina-silica (gamma-alumina-silica) having a silica content in the range of 1 to 15 wt. %, silica-alumina (silica-gamma-alumina) having a silica content in the range of 15 to 98 wt. %, and dispersions of finely distributed silica-alumina in a gamma-alumina matrix.

The most obvious silica-aluminas for the preparation of dispersions of silica-alumina in alumina are the well-known silica-alumina cogels and silica-alumina graft copolymers. For both of these types of silica-alumina it holds that they generally contain from 60 to 99 wt. %, preferably from 70 to 98 wt. %, of silica (based on the dry weight). After having been dried or not, the cogel or the graft polymer is mixed with an alumina hydrogel (boehmite). The silica content of the resulting dispersion usually is from 10 to 90 wt. %, preferably from 20 to 80 wt. %, based on the dry weight.

If so desired, the catalyst may also contain other constituents, such as phosphorus. It will be clear to the skilled person that phosphorus can be suitably incorporated into the catalyst by incorporating a suitable amount of a phosphorus-containing compound, such as phosphoric acid, into the impregnation solution containing one or more precursors of one or more hydrogenation metals to be incorporated. Phosphorus may also be incorporated into the catalyst by way of the coating present on the zeolite particles. One may, e.g., use zeolite particles comprising a multilayered coating prepared using phosphoric acid, or zeolite particles the negative charge of which has been enhanced with phosphoric acid before the coating was applied, as described before.

The coated zeolite particles can be incorporated into the hydrocracking catalyst in the same manner as is customary for uncoated zeolite particles. For instance, a catalyst can be prepared by mixing a support material, or more precisely, a precursor thereof, with the coated zeolite particles, extruding the resulting mass, impregnating the extrudates, after intermediate calcination or not, with a solution, often an aqueous solution, of precursors of the metal components and, optionally, a phosphorus-containing component, and subjecting the impregnated extrudates to a final calcination for 0.1 to 10 hours at a temperature from 400° to 700° C., in order to convert the metal component precursors to the oxide form and, where applicable, convert gamma-alumina precursors to gamma alumina. In addition, metal component precursors, or a portion thereof, can of course be admixed during the mixing of the (precursor) support material and the coated zeolite particles.

If the support material is a dispersion of silica-alumina in alumina, said dispersion can be mixed with the coated zeolite particles while it is in the gel form, but it can also be dried and/or calcined first. In a more preferred embodiment, the gel dispersion is first spraydried and the spraydried material is ground to a powder, whereupon this powder is mixed with the coated zeolite particles. The extrusion, impregnation, calcination, etc. processes can then be carried out as described above.

If no support material is present, the hydrocracking catalyst may be prepared by extruding a mass of coated zeolite particles, optionally mixed with metal component precursors, or a portion thereof, followed by the impregnation, calcination, etc. steps described above. Extrusion aids, which are known in the art, may optionally be added.

A preferred hydrocracking catalyst according to the invention is a hydrocracking catalyst comprising zeolite particles coated with alumina-silica, i.e., alumina comprising a minor amount of silica. The zeolite particles coated with alumina-silica may be mixed with a support material, such as alumina, and subsequently extruded, or they may be extruded without any additional support material being added. The extruded particles are calcined and impregnated with hydrogenation metal components.

In this manner a hydrocracking catalyst is obtained in which the strongly acidic zeolite and the mildly acidic alumina-silica are both satisfactorily dispersed in the final catalyst, resulting in a highly active catalyst.

As explained before, the cracking component which is present in a coated form in the hydrocracking catalyst according to the invention may also be an amorphous cracking component, such as silica-alumina or silica-magnesia. In general, the amorphous cracking components which may be used in hydrocracking catalysts are the amorphous analogons of the zeolites described in the present description, wherein again the broad definition of zeolite used in the present description should be taken into account. These amorphous analogons are defined as compounds with substantially the same chemical composition as the respective zeolites, but with an amorphous structure. Thus, in this definition, silica-alumina is the amorphous analogon of an aluminosilicate zeolite.

It is thus envisaged in the present invention to prepare hydrocracking catalysts comprising coated particles of an cracking component, e.g., silica-alumina or silica-magnesia. It is also envisaged in the present invention to prepare a hydrocracking catalyst comprising both coated zeolite particles and coated particles of an amorphous cracking component, for example, alumina coated zeolite particles mixed with alumina coated silica-alumina or silica-magnesia particles. Because the two kinds of particles are coated with alumina, they behave, as it were, as if they are alumina, and an exceptionally well dispersed mixture of zeolite particles and silica-alumina particles can be obtained. This will result in a hydrocracking catalyst with a high activity.

In all cases, i.e., when the catalyst comprises only coated zeolite particles as cracking component, when it comprises both coated zeolite particles and coated particles of an amorphous cracking component, e.g., coated silica-alumina particles, and when it comprises only coated particles of an amorphous cracking component, e.g., coated silica-alumina particles, the catalyst may further comprise a support material, e.g., alumina, but this is not essential.

The shape of the hydrocracking catalyst particles is variable. Suitable shapes are cylinders, spheres, rings, and symmetrical and asymmetrical polylobes, such as tri- or quadrulobes. Generally, they have a diameter in the range of 1 to 10 mm, and a length of 1 to 10 mm also.

If the catalyst comprises non-noble hydrogenation metals, it is advisable to render the catalyst, i.e., the metal components, sulphidic prior to its being used for hydrocracking hydrocarbons. This may be done in an otherwise conventional manner, say, by contacting the catalyst in the reactor at increasing temperature with hydrogen and a sulphur-containing feed, or with a mixture of hydrogen and hydrogen sulphide.

The hydrocracking of hydrocarbon feeds is performed by contacting the feed to be cracked with a catalyst in the presence of hydrogen. Usually, this is done at a hydrogen pressure in the range of about 100 to 250 bar and a temperature in the range of 230° to 450° C. The space velocity is in the range of 0.5 to 3 $hr^{-1}$, while the ratio of $H_2$ to the feed is in the range of 1000 to 2000 Nl/l.

The hydrocracking catalysts according to the invention can also be employed for cracking hydrocarbons under mild conditions, so-called Mild Hydrocracking (MHC). MHC is carried out at a temperature in the range of 350° to 430° C., a hydrogen pressure in the range of 25 to 100 bar, preferably in the range of 40 to 80 bar, a space velocity in the range of 0.3 to 2 $hr^{-1}$, and a ratio of $H_2$ to the feed in the range of 200 to 600 Nl/l.

The invention will be further elucidated with reference to a number of examples. First of all, various measuring techniques will be described.

The particle size distribution of the zeolite particles is determined with a laser diffraction instrument (Malvern Mastersizer) furnished with a 45 mm lens. The measuring cell is mounted between the 45 mm lens and the detector (Reverse Fourier Optics). The sample is slowly added to the dispersion unit, which contains 1 liter of water, until the desired obscuration (0.15–0.2) is achieved. Next, the sample is dispersed by 2 minutes of stirring and ultrasonic treatment. The measurement is then carried out using the presentation "1407" which indicates a relative refractive index of 1.35 and an adsorption index of 0.1.

The particle size ($Z_{avg}$) of the oxide is determined by quasi-elastic light scattering (QELS), also known as dynamic light scattering (DLS) or photon correlation spectroscopy (PCS), or by way of the laser diffraction technique described above for the zeolite particles. Which technique is to be used will depend on the expected particle size of the oxide particles, with QELS being used when the oxide particle size is expected to be below 1000 nm and laser diffraction when the particle size is expected to be above 1000 nm. The QELS analysis is carried out with a Malvern System 4700. A cuvette containing an aqueous solution of the compound the $Z_{avg}$ of which is to be determined is placed in a narrow laser beam (633 nm He-Ne), and the light scattered at an angle of 90° is measured by a sensitive detector. The signals obtained from 10–30 second runs are used to calculate the $Z_{avg}$ and the polydispersity using a type 7032-CN computing correlator and Automeasure software. The $Z_{avg}$ value is taken as the particle size of the oxide, while the variance of $Z_{avg}$ represents the polydispersity.

The surface area characteristics are obtained from the nitrogen adsorption isotherm at 78K, which can be determined using commercially available equipment, e.g., Micromeritics A.S.A.P.-2400 or Gemini-2360. The SPESA (single point equivalent surface area) is calculated from the adsorption $V_a$ at a relative pressure $P/P_0$ of 0.30, according to the equation:

$$SPESA\ (m^2/g)=4.353(1-P/P_0)V_a(ml/g\ \text{at standard}\ T\ \text{and}\ P)$$

$V_a$ is interpolated from adjacent points on the adsorption isotherm.

To calculate the micro PV and the meso SA the nitrogen adsorption isotherm in the range of $P/P_0$=0.08 to 0.80 is converted to a t-plot using the Harkins-Jura equation given by de Boer et al. (*J. Colloid Interface Sci.* Vol. 21 (1966), 405), with t standing for the thickness of the adsorbed layer.

$$t(\text{Å})=\left(\frac{13.99}{0{,}034-\log P/P_0}\right)^{1/2}$$

Since the t-plots of zeolites are slightly curved, the part of the plot used for determining the slope and the intercept has to be specified. In the present application the range employed is from t is 6 Å to t is 9 Å. The straight line drawn through the points in this range with the aid of the least squares method has an intercept $V_{mi}$ and a slope $\Delta V_a/\Delta t$.

EXAMPLE 1

Preparation of a hydrocracking catalyst comprising coated zeolite particles

Catalyst A comprising coated zeolite particles according to the invention was prepared as follows. To 14 kg of commercially available Y-zeolite with an $a_0$ of 24.29 Å and a silica-alumina molar ratio of about 30 an amount of 70 kg water was added to create a 20% slurry. The slurry was milled in a dyno-mill glass pearl mill. After milling the mean particle size of the zeolite particles was 2.3 micron. To 80.45 kg slurry (containing 13.2 kg zeolite and 67.33 kg water) an additional 114 kg of water were added. The slurry was stirred in a 250 liter reactor. 26.52 kg of a 5 wt % alumina slurry ($Z_{avg}$ is 200 nm) which had been peptised using $HNO_3$ was added to the zeolite slurry. The slurry was aged for 15 minutes. The solid product was filtered off and dried overnight at 120° C. The material was subsequently calcined at 300° C. for 45 minutes in a muffle furnace.

The thus-obtained coated zeolite particles possessed a coating of 10 wt. % of alumina, calculated on the weight of the zeolite.

1063 g of milled coated zeolite as prepared above (LOI=5.95%) were mixed with 1324 g of pseudoboehmite alumina (LOI=24.49%). Sufficient dilute $HNO_3$ was added to create an extrudable mixture, which was subsequently extruded. The dried extrudates (120° C., overnight) were calcined in a rotary calciner at 550° C. for 1 hour, using a flow of 6 $Nm^3/h$ of air preheated at 300° C.

The extrudates were sized to an average length of 4 mm. A solution containing appropriate amounts of ammonium metatungstate (AMT) and nickel nitrate was used to create a final metal loading of 21 wt % $WO_3$ and 6 wt % NiO by pore volume impregnation. The extrudates were dried at a temperature of 132° C. for 1 hour. The dried extrudates were calcined in a rotary calciner at 470° C. for 1 hour, using a flow of 6 $Nm^3/h$ of air preheated at 300° C.

EXAMPLE 2

Preparation of a reference catalyst comprising uncoated zeolite particles

Comparative Catalyst A' comprising uncoated zeolite particles was prepared by a process analogous to the process described in Example 1. Care was taken to ensure that the amount of zeolite in both catalysts was the same.

The catalyst was prepared by mixing appropriate amounts of the zeolite used in Example 1 and the pseudoboehmite alumina used in Example 1. Sufficient dilute $HNO_3$ was added to create an extrudable mixture, which was subsequently extruded. The dried extrudates (one night at 120° C.) were calcined in a rotary calciner at 550° C. for 1 hour, using a flow of 6 $Nm^3/h$ of air preheated at 300° C.

The extrudates were sized to an average length of 4 mm. A solution containing appropriate amounts of AMT and nickel nitrate was used to create a final metal loading of 21 wt % $WO_3$ and 6 wt % NiO by pore volume impregnation. The extrudates were dried at a temperature of 132° C. for 1 hour. The dried extrudates (120° C., overnight) were calcined in a rotary calciner at 470° C. for 1 hour, using a flow of 6 $Nm^3/h$ of air preheated at 300° C.

TABLE 1

| Analytical Data | | |
|---|---|---|
| | Catalyst A | Comparative Catalyst A' |
| Zeolite properties | | |
| $a_0$ (nm) | 2.429 | 2.429 |
| wt. % Na2O | 0.11 | 0.04 |
| wt. % Al2O3 | 38.9 | 36.5 |

TABLE 1-continued

| | Analytical Data | |
|---|---|---|
| | Catalyst A | Comparative Catalyst A' |
| wt. % SiO2 | 31.5 | 35.8 |
| Catalyst properties | | |
| wt. % WO3 | 21.2 | 20.3 |
| wt. % NiO | 6.0 | 5.8 |
| SPESA ($m^2/g$) | 320 | 354 |
| HgPV >1,8 nm (ml/g) | 0.2180 | 0.3069 |
| HgPV >2,1 nm (ml/g) | 0.2127 | 0.3019 |
| HgPV >5 nm (ml/g) | 0.0153 | 0.1617 |
| HgPV >10 nm (ml/g) | 0.0026 | 0.0809 |

EXAMPLE 3

Catalyst Testing

Catalyst A and Comparative Catalyst A' prepared as described in Examples 1 and 2, respectively, were tested for their suitability in hydrocracking hydrocarbons. To this end, 100 ml of each catalyst, diluted with carborundum, were loaded in a tubular reactor fitted with a thermowell.

The catalysts were pretreated at 370° C. in a flow of $H_2/H_2S$ (98 Vol %/2 Vol %), at 30 bar, and a flow rate of 70 Nl/h, until $H_2S$ breakthrough. The catalysts were subsequently cooled down to 150° C., and purged with $H_2$, after which the feed was introduced. The feed was a hydroprocessed VGO with the properties given in Table 2.

TABLE 2

| Feed properties | | |
|---|---|---|
| ASTM D-1160 | IBP | 206° C. |
| | 5% | 220° C. |
| | 10% | 326° C. |
| | 30% | 378° C. |
| | 50% | 408° C. |
| | 70% | 437° C. |
| | 90% | 488° C. |
| | 95% | 513° C. |
| | FBP | 532° C. |
| Density (50° C.) | | 0.8592 g/ml |
| Nitrogen | | 16 ppm |
| Sulphur | | 0.021 wt. % |
| Refr. Index | | 1.4761 |
| C/H NMR | | 13.26 |
| Aniline pt. | | 88.6° C. |
| Aromatics | | |
| Sats + Olef | | 70.9 wt. % |
| Mono | | 22.3 wt. % |
| Di | | 5.0 wt. % |
| Tri+ | | 1.9 wt. % |

In this table, C/H NMR stands for the weight percentage of hydrogen in the feed as determined with hydrogen NMR. The other parameters are known to the person skilled in the art.

The catalysts were tested under two conditions. In the first case (simulating second stage hydrocracking), the temperature was adjusted to reach a conversion of 70%. The selectivities of the catalysts at this conversion level are given in Table 3.

TABLE 3

| Selectivity at second stage hydrocracking | | |
|---|---|---|
| Product/Boiling range | Catalyst A | Comparative Catalyst A' |
| C1-C4 | 2.8 | 2.8 |
| C4-85° C. | 7.0 | 8.4 |
| 85–196° C. | 29.5 | 30.5 |
| 196–260° C. | 16.8 | 15.5 |
| 260–391° C. | 27.5 | 26.5 |

In the second case (simulating first stage hydrocracking), the feed was spiked with 1000 ppm N and 2 wt % of S, using tert.butylamine as the nitrogen source and dimethyldisulphide (DMDS) as the sulphur source. The temperature was adjusted to reach 40% conversion. The selectivities of the catalysts at this conversion level are given in

TABLE 4

| Selectivity at first stage hydrocracking | | |
|---|---|---|
| Product/Boiling range | Catalyst A | Comparative Catalyst A' |
| C1–C4 | 1.0 | 1.7 |
| C4-85° C. | 4.5 | 4.7 |
| 85–196° C. | 16.5 | 16.0 |
| 196–260° C. | 12.5 | 11.8 |
| 260–391° C. | 31.5 | 32.5 |

Surprisingly, the catalyst according to the invention shows a significantly lower selectivity to products in the lower boiling range (up to 85° C.), and, especially under second stage conditions, a significantly improved middle distillate selectivity.

EXAMPLE 4

Preparation of a catalyst comprising coated silica-alumina

First the amount of $Al_2O_3$ needed to coat the silica-alumina sample was determined. To this end, a series of heterocoagulation experiments was performed. The required amount was found to be 19 wt. %.

To 4000 g of silica-alumina comprising 75 wt. % of silica and 25 wt. % of alumina an amount of 26 kg water was added to create a 13% slurry. The slurry was milled three times in a dynomill glass pearl mill. The mean particle size of the silica-alumina after milling was 6.1 μm. After milling, an amount of 7678 g alumina slurry ($Z_{avg}$ is 200 nm), which had been peptised using dilute $HNO_3$, was added to coat the silica-alumina with 19 wt. % of $Al_2O_3$. After 15 minutes of stirring the slurry was dried overnight on plates at 120° C. To secure the alumina to the silica-alumina the material was calcined at 300° C. for 45 minutes in a muffle furnace.

A catalyst was prepared using the coated silica-alumina. 947.26 g of milled coated silica-alumina (LOI=16.39%) were mixed with 1322.4 g of pseudoboehmite (LOI=26.8%) and 240 g $MoO_3$. Dilute $HNO_3$ was added to create an extrudable mixture, which was then extruded. After drying overnight at 120° C. the extrudates were calcined in a rotary calciner at 550° C. for 1 hour, with a preheated air flow of 6.23 $Nm^3/h$.

The extrudates were sized to an average length of 4 mm. A solution of cobalt nitrate hydrate was used to create a final metal loading of 3.1% CoO. The extrudates were dried at a temperature of 130° C. for 1 hour. The final calcination was carried out in a rotary calciner at 530° C. for 1 hour, with a preheated air flow of 6.23 $Nm^3/h$. The final catalyst contained 11.5 wt % $MoO_3$ and 3.1 wt % CoO.

EXAMPLE 5

Extrusion of coated zeolite particles without a binder being present

As explained before, the presence of a coating on the zeolite particles facilitates the extrusion of the catalyst particles because the coated zeolite particles behave as if they were the oxide with which they were coated. This makes it possible to prepare hydrocracking catalysts without any additional support material at all. This example illustrates that it is indeed possible to extrude a matrix comprising coated zeolite particles without any additional matrix material or binder being present.

280.5 grams of the coated zeolite prepared in Example 1 (10% $Al_2O_3$ in coating, LOI=8.8 %) were kneaded with 238 grams of water mixed with sufficient $HNO_3$ to prepare an extrudable mix. 2.9 grams of a commercially available surfactant was added as extrusion aid. The mixture was extruded to form 1.5 mm cylinders. A portion of the extrudates was statically calcined at 550° C. in air. The crushing strength of the extrudates was satisfactory.

EXAMPLE 6

Influence of the presence of a coating on the stability of zeolite in a basic environment.

The resistance to basic circumstances of the Y-zeolite used in Example 1 in coated and uncoated condition was tested as follows.

5.32 grams of zeolite particles, either coated or uncoated, were added to a jar containing 10 ml of a 0.1 mole/l ammoniumchloride solution. The pH of the thus obtained zeolite slurry was set to the desired value with 25% ammoniumhydroxide. The slurries were heated for 1 hour at 80° C., and dried overnight at 120° C. The crystallinity of the zeolite samples was determined using X-ray diffraction according to ASTM method D3906. The uncoated zeolite as such was used as standard, and the crystallinity thereof was set at 100%. The results of these tests are given in Table 5.

TABLE 5

Stability of coated and uncoated zeolites under basic conditions

| pH | crystallinity uncoated zeolite (%) | crystallinity coated zeolite (%) |
|---|---|---|
| 8 | 34 | 66 |
| 9 | 11 | 24 |
| 10 | 0 | 7 |

From Table 5 can be seen that both for coated zeolite particles and for uncoated zeolite particles the crystallinity decreases with increasing pH. However, it is evident that the coated zeolite particles suffer less from the basic conditions than the uncoated zeolite particles. Thus, it must be concluded that the coating protects the zeolite from the high pH values.

We claim:

1. Hydrocracking catalyst comprising at least one hydrogenation metal component and a cracking component which is either a zeolitic cracking component, or an amorphous cracking component, or a mixture thereof, wherein the zeolitic cracking component is an aluminosilicate zeolite or a non-aluminosilicate molecular sieve, wherein the cracking component has a mean particle size in the range of 0.1 μm to 10 μm, and wherein at least 50% of the outer surface of said cracking component particles is coated with a layer of pre-formed inorganic oxide or pre-formed inorganic hydroxide or combinations thereof, which layer has a thickness in the range of 10 nm to 5 μm and which coated cracking component particles have a mean particle size of 0.11 μm to 15 μm.

2. Hydrocracking catalyst of claim 1 wherein the cracking component comprises component particles which have been coated by contacting uncoated cracking component particles with an aqueous medium containing particles of an inorganic oxide having a particle size in the range of 10 to 5000nm, wherein the ratio between the oxide particle size and the mean particle size of the cracking component particles is in the range of 0.001:1 to 0.5:1.

3. Hydrocracking catalyst according to claim 2 wherein the cracking component particles are dried and/or calcined after they have been contacted with the oxide particles containing aqueous medium.

4. Hydrocracking catalyst according to claim 1 wherein the cracking component is a zeolitic cracking component.

5. Hydrocracking catalyst according to claim 1 wherein the cracking component is amorphous silica-alumina, alumina-silica, or silica-magnesia.

6. Hydrocracking catalyst according to claim 1 wherein the coating oxide is alumina or alumina-silica.

7. Hydrocracking catalyst according to claim 1 wherein a Group VIB metal component and a Group VIII metal component are present as hydrogenation metal components.

8. A method for converting hydrocarbonaceous feedstocks to lower boiling point products which comprises contacting said feedstock with the hydrocracking catalyst of claim 1 under hydrocracking conditions.

* * * * *

UNITED STATES PATENT AND TRADEMARK OFFICE

CERTIFICATE OF CORRECTION

PATENT NO. : 5,851,378

DATED : December 22, 1998

INVENTOR(S) : Eelco Titus Carel VOGT and Hendrik Gerard BRUIL

It is certified that error appears in the above-identified patent and that said Letters Patent is hereby corrected as shown below:

On the title page, in item [75] Inventors, "Utrech" should be "Utrecht".

On the front cover, in item [56] References Cited, after "U.S. Patent Documents", first reference, "4,023,869" should be "4,203,869".

Column 10, line 19, after "of", "an" should be "a".

Column 14, line 17, after "in", insert --Table 4.--.

Signed and Sealed this

Tenth Day of August, 1999

Attest:

Q. TODD DICKINSON

*Attesting Officer*

*Acting Commissioner of Patents and Trademarks*